A. L. PUTNAM.
SECURING DEVICE FOR DEMOUNTABLE WHEELS.
APPLICATION FILED JUNE 27, 1919.
1,384,150. Patented July 12, 1921.
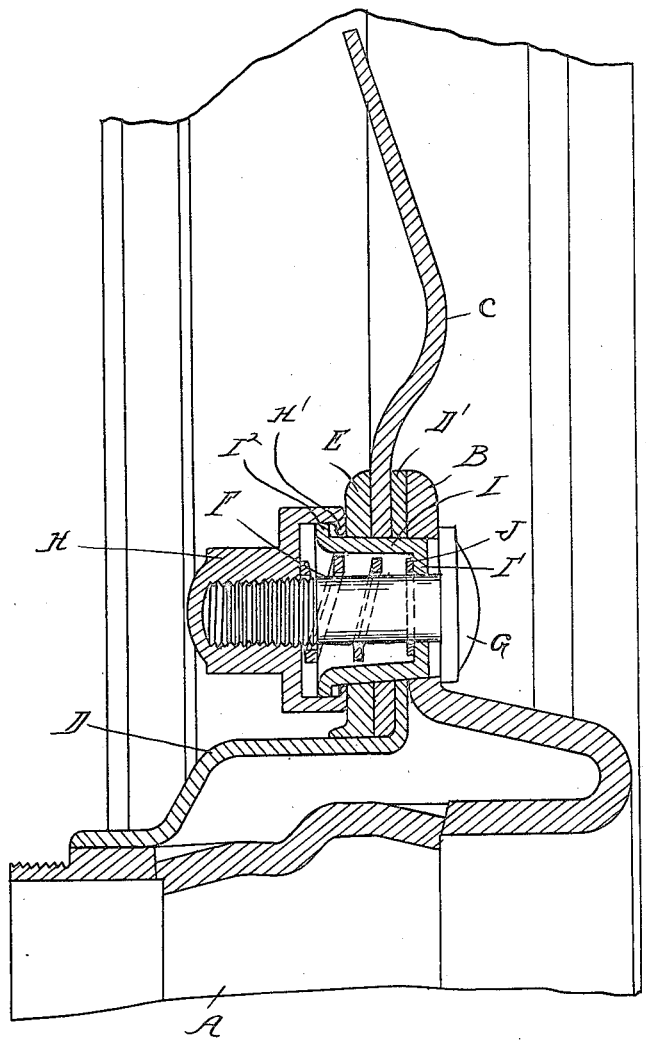
Inventor
Alden L. Putnam
By Whittemore, Hulbert & Whittemore
Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

SECURING DEVICE FOR DEMOUNTABLE WHEELS.

1,384,150.      Specification of Letters Patent.      Patented July 12, 1921.

Application filed June 27, 1919. Serial No. 307,141.

*To all whom it may concern:*

Be it known that I, ALDEN L. PUTNAM, a citizen of the United States of America, residing at Detroit, in the county of Wayne and State of Michigan, have invented certain new and useful Improvements in Securing Devices for Demountable Wheels, of which the following is a specification, reference being had therein to the accompanying drawings.

The invention relates to demountable wheels of the disk type, and in which the disk is secured to a flange hub through the medium of clamping studs or bolts. The present invention has more particular reference to a construction of clamping studs, and it is the object of the invention to provide a construction which will automatically compensate for any inaccuracies. The invention therefore comprises the construction as hereinafter set forth.

In the drawings:

The figure is a section through the hub and a portion of the demountable wheel showing my improved construction of securing means.

A is the wheel hub which is provided with a radially outwardly-extending flange B, and C is the disk wheel which is seated upon the hub adjacent to said flange. As specifically shown, the seat for the disk is formed by a pressed sheet metal hub member D having a cylindrical portion for fitting the central aperture in the disk and an outwardly-extending flange D' lying adjacent to the flange B. E is a clamping ring fitting around the member D and bearing against the outer face of the disk.

To secure the members E and C to the flange B I have provided a series of fasteners of the following construction: F are bolts having heads G which are secured to the flange B by any suitable means. H are nuts having a threaded engagement with the outer ends of the bolts and I are tapering sleeves surrounding the bolts and adapted to engage registering tapering apertures in the members B, C, D' and E. The sleeve members I are recessed to receive springs J which extend between the nuts H and shoulders I' upon said sleeves. The tension of these springs is exerted to force the sleeves I inward into the tapering apertures when the nuts H are screwed upon the bolts G.

There is also an engagement between the nuts H and sleeves I formed by the flanges H' and I² upon the respective members H and I, and the arrangement is such that a limited relative longitudinal movement of the members H and I is permitted.

With the construction as described when the disk is to be mounted, it is placed upon the hub and seated upon the member D with its apertures in registration with the apertures in the flanges B. The clamping ring E is then placed upon the hub and is also registered therewith. The nuts H with the sleeve members and the spring J attached thereto may then be engaged with the bolts G and screwed inward to force the tapering sleeves to seat within the tapering apertures. It is not feasible in manufacturing to secure such accuracy that the tapering sleeves will seat at the same time that the clamping faces on the nuts come into contact with the clamping member E. This, however, is compensated for by the yielding of the springs J which, when the members I are seated, will still permit further movement of the nuts H. Moreover, the tension of the springs is sufficient to hold the sleeves to their seats. Thus when all of the nuts are tightened, the disk will be firmly clamped to the flange and all of the tapering sleeves will be seated in the registering tapering apertures.

What I claim as my invention is:

1. In a wheel, the combination with complementary members having abutting portions with registering tapering apertures, of a headed bolt extending through the registering apertures, a clamping nut engaging said bolt, a tapering sleeve secured to the one with provision for a limited longitudinal movement, and resilient means for yieldably pressing said sleeve to seat the same in said tapering apertures and to permit the further relative adjustment of said members into a clamping engagement.

2. In a wheel, the combination with complementary members having abutting portions with registering tapering apertures therein, of clamping means for said members comprising a bolt and a nut, the one having secured thereto a tapering sleeve for seating engagement in said tapering apertures, said sleeve having a limited longitudinal movement upon the member to which it is attached, and a spring for yieldably passing said tapering member toward its seat.

3. In a wheel, the combination with complementary members having abutting portions with registering tapering apertures therein, of clamping means for said members comprising a bolt and a nut, the one being provided with a tapering sleeve for seating in said tapering apertures, said member to which the sleeve is attached having a clamping shoulder for engaging with one of said registering abutting members and also having freedom for a limited longitudinal adjustment with respect to said sleeve, and a spring for yieldably pressing said sleeve toward its seat permitting the independent seating of the member to which it is attached.

4. In a wheel, the combination with complementary members having abutting portions with registering tapering apertures therein, of securing means for said members comprising a headed bolt secured to one of said members and passing through the aperture therein, a nut for engaging said bolt having a clamping shoulder for engaging the other of said complementary members, a tapering sleeve surrounding said bolt and secured to said nut with a limited longitudinal adjustment thereon, and a spring within said sleeve and surrounding said bolt for yieldably pressing the sleeve toward its seat and permitting the independent seating of said nut.

5. In a wheel, the combination with complementary members having abutting portions with registering tapering apertures therein, of clamping means for said members comprising a headed bolt secured to one of said members and passing through the aperture therein, a nut for engaging said bolt, a tapering sleeve secured to said nut with freedom for a limited longitudinal adjustment, said sleeve being adapted to seat in said tapering apertures, and a spring within said sleeve surrounding said bolt and having its opposite ends abutting respectively on said sleeve and said nut, for the purpose described.

6. In a wheel, the combination with complementary members having abutting portions with registering tapering apertures, of clamping means securing said abutting members to each other, an exteriorly tapering sleeve engaging in said apertures and forming a driving connection between said abutting members, and a spring coiled within said sleeve and pressing the same into said apertures.

7. In a wheel, the combination with a hub having an outwardly extending annular flange of a wheel body mounted upon said hub and abutting against said flange, said flange and wheel body having registering tapering apertures, a tapering sleeve engaging in said apertures, a supporting element for said sleeve extending freely therethrough and a spring coiled upon the last named element within said sleeve, and pressing the latter into said apertures.

In testimony whereof I affix my signature.

ALDEN L. PUTNAM.